United States Patent
Haverlag et al.

(10) Patent No.: US 11,147,145 B2
(45) Date of Patent: Oct. 12, 2021

(54) SYSTEM, METHOD AND DEVICES FOR IMPLEMENTING A FACTORY RESET OF A LUMINAIRE

(71) Applicant: SIGNIFY HOLDING B.V., Eindhoven (NL)

(72) Inventors: Marco Haverlag, Mierlo (NL); Leendert Teunis Rozendaal, Valkenswaard (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/734,721

(22) PCT Filed: May 27, 2019

(86) PCT No.: PCT/EP2019/063601
§ 371 (c)(1),
(2) Date: Dec. 3, 2020

(87) PCT Pub. No.: WO2019/233796
PCT Pub. Date: Dec. 12, 2019

(65) Prior Publication Data
US 2021/0227673 A1   Jul. 22, 2021

(30) Foreign Application Priority Data
Jun. 5, 2018   (EP) ..................... 18175867

(51) Int. Cl.
*H05B 47/19*   (2020.01)
*H05B 47/18*   (2020.01)

(52) U.S. Cl.
CPC ............. *H05B 47/19* (2020.01); *H05B 47/18* (2020.01)

(58) Field of Classification Search
CPC ........ H05B 47/11; H05B 47/16; H05B 47/18; H05B 47/19; H05B 47/115; H05B 47/175; H05B 47/195; Y02B 20/40
See application file for complete search history.

(56) References Cited

U.S. PATENT DOCUMENTS 9,603,225 B2 *   3/2017   Thijssen ................ H05B 47/19
10,356,885 B2    7/2019   Deixler et al.
(Continued)

FOREIGN PATENT DOCUMENTS

WO   2015039980 A1   3/2015
WO   2017063882 A1   4/2017
(Continued)

*Primary Examiner* — Haissa Philogene

(57) ABSTRACT

A system for implementing a factory reset of a luminaire. The system comprises a luminaire; and a user device, the user device being configured to transmit, to the luminaire via a first communication medium, a message for triggering onset of a factory reset time-out period of the luminaire. The luminaire is configured to receive, the message for triggering the onset of the factory reset time-out period of the luminaire. The user device is further configured to transmit, to the luminaire via a second, different communication medium, a command comprising a factory reset code, FRC, for triggering a factory reset of the luminaire. The luminaire is further configured to: receive the command comprising the FRC, and implement a factory reset of the luminaire if the command comprising the FRC is received from the user device within the factory reset time-out period.

14 Claims, 3 Drawing Sheets

(56) References Cited

U.S. PATENT DOCUMENTS

| | | |
|---|---|---|
| 10,687,407 B2 | 6/2020 | Rademakers et al. |
| 10,694,374 B2 | 6/2020 | Yang et al. |
| 10,769,315 B2 * | 9/2020 | Velusamy ............... H04L 63/20 |
| 2010/0091686 A1 | 4/2010 | Rutjes et al. |
| 2011/0149803 A1 | 6/2011 | McCormack et al. |
| 2011/0199020 A1 | 8/2011 | Henig et al. |
| 2011/0295389 A1 | 12/2011 | McCormack |
| 2016/0095193 A1 | 3/2016 | Mokhtari et al. |
| 2016/0134369 A1 | 5/2016 | Weda et al. |
| 2016/0203706 A1 | 7/2016 | Holtman et al. |
| 2016/0338170 A1 | 11/2016 | Lebel et al. |
| 2017/0118636 A1 | 4/2017 | Zoorob |
| 2018/0227998 A1 * | 8/2018 | Polychronakis ....... H05B 47/19 |
| 2019/0132932 A1 * | 5/2019 | Klecha ................... H05B 45/60 |
| 2020/0050753 A1 * | 2/2020 | Davis .................... G01R 22/10 |
| 2021/0051538 A1 * | 2/2021 | Huang ................... H04W 4/80 |

FOREIGN PATENT DOCUMENTS

| | | |
|---|---|---|
| WO | 2018162397 A1 | 9/2018 |
| WO | 2019048278 A1 | 3/2019 |

\* cited by examiner

SYSTEM, METHOD AND DEVICES FOR IMPLEMENTING A FACTORY RESET OF A LUMINAIRE

CROSS-REFERENCE TO PRIOR APPLICATIONS

This application is the U.S. National Phase application under 35 U.S.C. § 371 of International Application No. PCT/EP2019/063601, filed on May 27, 2019, which claims the benefit of European Patent Application No. 18175867.3, filed on Jun. 5, 2018. These applications are hereby incorporated by reference herein.

TECHNICAL FIELD

The present disclosure relates to implementing a factory reset of a luminaire.

BACKGROUND

Connected lighting refers to a system of one or more luminaires (or illumination sources) which are controlled not by (or not only by) a traditional wired, electrical on-off or dimmer circuit, but rather by using a data communications protocol via a wired or more often wireless connection, e.g. a wired or wireless network. Typically, the luminaires, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol). The lighting control device may take the form of a user terminal, e.g. a portable user terminal such as a smartphone, tablet, laptop or smart watch; or a static user terminal such as a desktop computer or wireless wall-panel. In such cases the lighting control commands may originate from an application running on the user terminal, either based on user inputs provided to the application by the user through a user interface of the user terminal (e.g. a touch screen or point-and-click interface), and/or based on an automatized function of the application. The user equipment may send the lighting control commands to the luminaires directly, or via an intermediate device such as a wireless router, access point or lighting bridge.

There is an ongoing trend in the professional lighting market to move more towards connected lighting systems which enable features such as, for example, (remote) scheduling, energy monitoring, sensor based lighting control and asset management. In many cases these systems are installed in existing buildings, in which case a wireless network is preferred in order to avoid having to draw cables (for lighting control) through the ceiling. Examples of such wireless network protocols which are used widely in current practice are open standards like ZigBee, Thread, BLE mesh, Wi-Fi and various proprietary network implementations built on top of the IEEE 802.15.4, 802.15.1 or 802.11 standards.

Before the networked lighting system can be used the system first has to be commissioned, which means that all the relevant wireless luminaires are connected to a single network, and when so desired added to different groups and zones, each with their own behaviour. In order to do this, the installer or commissioner must communicate with each individual luminaire and send it the appropriate commands to join the network and/or add it to these groups or zones.

This is currently implemented in two different ways. In the most basic case a controller box (or the first luminaire) is commanded to open a network which allows other luminaires to join this network. In many cases the wireless network in factory-new state will automatically start looking for an open network and then joins this network automatically (this is sometimes referred to as "auto-joining"). After this initial auto joining stage the installer can start to form groups and zones in the network e.g. by doing a blink search. During this blink search the installer gives (more or less at random) a command to one or more luminaires to identify where they are and/or that they are by blinking. The installer then decides to which group or zone the luminaire(s) belong, and can decide at that point to add it to a specific group or not. The blinking could also be done by the system where the installer has to indicate where the luminaire is located on a map (e.g. on tablet) which implicitly assigns it to the relevant group(s). Alternatively the installer uses a pointing device (e.g. an IR remote control or a flashlight) which sends a signal to a sensor in the luminaire to identify which luminaire should be added to a specific group during the commissioning process.

During this process a luminaire may end up in the wrong group of luminaires or wrong network. For example, a luminaire may be placed in the wrong group or wrong network if multiple groups or networks are used throughout the building and several installers are working in parallel. There may also be other wireless networks (in 'open' state) in the building for other purposes (e.g. HVAC). For this reason most existing systems offer a method to send a 'factory reset' command which effectively resets the network configuration inside the luminaire and makes it possible for that luminaire to become part of a different network instead (and to retry the commissioning steps by letting the luminaire search for an open network again).

US 20110149803 A1 relates to a wireless network system and a method for commissioning a wireless network system. The network system comprises at least a network device and a joining device. In a commissioning mode, the network device broadcasts network identification information. The joining device sends, upon reception of the network identification information, a request to said network device to join the network, comprising a predefined address of said joining device. The network device assigns said joining device a network address and stores corresponding data. The network device sends joining information comprising at least said network address to said joining device using said predefined address and said joining device receives the network address, so that the joining device is addressable in the network system using said network address.

SUMMARY

According to a first aspect disclosed herein, there is provided a system comprising: a luminaire; and user device, wherein the user device is configured to transmit, to the luminaire, a message for triggering onset of a factory reset time-out period of the luminaire, wherein the message is transmitted via a first communication medium; wherein the luminaire is configured to receive, from the user device, the message for triggering the onset of the factory reset time-out period of the luminaire, wherein the message is received via the first communication medium; wherein the user device is configured to transmit, to the luminaire, a command comprising a factory reset code, FRC, for triggering a factory reset of the luminaire, wherein the command is transmitted via a second, different communication medium; and wherein the luminaire is configured to: receive, from the user device, the command comprising the FRC, wherein the command is received via the second communication medium; and implement a factory reset of the luminaire if the command comprising the FRC is received from the user device within the factory reset time-out period.

Previous methods for implementing a factory reset of a luminaire are flawed in that they are unsecure and thus allow malicious users to disrupt the operation of the luminaire or system of luminaires. The present system however requires a user to be present and in close proximity to a luminaire in order to implement a factory reset.

The first wireless communication medium has a first, limited physical range which is determined by the first wireless communication medium. The second wireless communication medium has a second, limited physical range which is determined by the second wireless communication technology.

The present invention allows an incorrectly commissioned luminaire, e.g. one that as a result of an automatic commissioning process was commissioned incorrectly, to be individually addressed and placed in a state that allows the device to be reset by a nearby commissioner. In this manner it may be possible to e.g. fix a situation wherein a luminaire did not end up in a "room"-group together with the other luminaires in the room, but instead got commissioned into a group belonging to an adjacent room. After the commissioner resets the luminaire, the luminaire may retry and/or the commissioner could commission the device correctly. The message for triggering the onset of the factory reset time-out period may be addressed to one particular luminaire in particular (single target) or could be addressed to multiple luminaires, e.g. using a groupcast/multicast message to all, or alternatively a number, of devices to be reset.

In embodiments, the second communication medium may be one of: (a) infrared, (b) coded light, (c) radio or (d) near-field communication.

In embodiments, the second communication medium may have at least one additional physical constraint limiting the transmission of the command from the user device to the luminaire other than just a limited range, e.g. resulting from signal propagation in air (radius).

In embodiments, the at least one additional physical constraint may comprise at least one of: (a) requiring a line-of-sight between the luminaire and the user device, and (b) requiring a physical contact between the luminaire and the user device.

In embodiments, the luminaire may be configured to determine if the command comprising the FRC is received within the factory reset time-out window.

For example, the message and command may comprise transmission time stamps. In another example, the luminaire may record the time of arrival of the message and command.

In embodiments, the first communication medium may be radio.

In embodiments, the first communication medium may be a wired communication connection between the user device and the luminaire.

In embodiments, the message for triggering the factory reset window may comprise the factory reset time-out period.

In embodiments, the user device may be configured to allow a user of the user device to set the factory reset time-out period.

In embodiments, the system may comprise a second luminaire, wherein the user device may be configured to transmit, to the second luminaire, a second message for triggering onset of a second factory reset time-out period of the second luminaire, wherein the second message is transmitted via the first communication medium; wherein the second luminaire is configured to receive, from the user device, the second message for triggering onset of the factory reset time-out period of the second luminaire, wherein the message is received via the first communication medium; wherein the user device is configured to transmit, to the second luminaire, a second command comprising a factory reset code, FRC, for triggering a factory reset of the second luminaire, wherein the second command is transmitted via the second communication medium; and wherein the second luminaire is configured to: receive, from the user device, the second command comprising the FRC, wherein the second command is received via the second communication medium; and implement a factory reset of the second luminaire if the second command comprising the FRC is received from the user device within the second factory reset time-out period.

In embodiments, the user device may be configured to broadcast a single message for triggering onset of the factory reset time-out period of each luminaire in the system, wherein the single message is broadcast via the first communication medium.

In embodiments, each luminaire may share the same FRC, and wherein the user device may be configured to broadcast a single command comprising the shared FRC, wherein the single command is broadcast via the second communication medium.

In embodiments, the user device may be configured to store the FRC in memory of the user device.

According to a second aspect disclosed herein, there is provided a method comprising: transmitting, from a user device to a luminaire, a message for triggering onset of a factory reset time-out period of the luminaire, wherein the message is transmitted via a first communication medium; receiving, at the luminaire from the user device, the message for triggering onset of the factory reset time-out period of the luminaire, wherein the message is received via the first communication medium; transmitting, from the user device to the luminaire, a command comprising a factory reset code, FRC, for triggering a factory reset of the luminaire, wherein the command is transmitted via a second, different communication medium; receiving, at the luminaire from the user device, the command comprising the FRC, wherein the command is received via the second communication medium; and implementing a factory reset of the luminaire if the command comprising the FRC is received from the user device within the factory reset time-out period.

According to a third aspect disclosed herein, there is provided a luminaire comprising: a first receiver configured to receive, from a user device via a first communication medium, a message for triggering onset of a factory reset time-out period of the luminaire; and a second receiver configured to receive, from the user device via a second, different communication medium, a command comprising a factory reset code, FRC; and a controller configured to: determine if the command comprising the FRC is received within the factory reset time-out period; and implement a factory reset of the luminaire, if the command comprising the FRC is determined to be received from the user device within the factory reset time-out period.

According to a fourth aspect disclosed herein, there is provided a user device comprising: a first transmitter configured to transmit, to a luminaire, a message for triggering onset of a factory reset time-out period of the luminaire, wherein the message is transmitted via a first communication medium; a second transmitter configured to transmit, to the luminaire, a command comprising a factory reset code, FRC, for triggering a factory reset of the luminaire, wherein the command is transmitted via a second, different communication medium; and a controller configured to: cause the first transmitter to transmit the message for triggering onset of the factory reset time-out period of the luminaire; and cause the second transmitter to transmit the command comprising the FRC.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

In wireless connected lighting systems the first step after physical installation is the commissioning of the network. This places different wireless luminaires into network groups, in which the luminaires can communicate with each other and, if so desired, with a wireless gateway such as a central lighting bridge. Sometimes the commissioning process does not go as intended and the wrong luminaires end up in the network (or the wanted luminaires end up in another network). To correct this, it is possible to remove these luminaires from the existing network group by restoring them to a factory reset mode, and then re-attempting the commissioning process.

Previous methods for implementing a factory reset of a luminaire do not have any form of security built-in, which enables the possibility that malicious persons can remove luminaires from the network, disabling the correct functioning of the wireless lighting system. For example, the removal of a luminaire means that sensor-based occupancy detections from the removed luminaire no longer reach the other luminaire in the same zone or group, and hence these luminaire will no longer respond to this sensor. In addition this also works in the opposite direction; the affected luminaire will no longer receive any sensor detections from other members of the group and hence will not respond to them. In addition, global on/off or dimming commands (e.g. from a building automation environment) will not reach the application logic in the luminaire so it remains in the same (on or off) state indefinitely. For these reasons, amongst others, it is necessary this the 'factory reset command' or 'factory reset code' (FRC) cannot be communicated to the luminaire by unauthorized people (e.g. by hacking into the lighting network), and instead only given by the installer responsible for the system maintenance.

Embodiments of the present invention ensure that only an authorised user who is within close proximity of a luminaire is able to trigger a factory reset of the luminaire.

When a device ends up in the wrong group/zone in a single network, the message that triggers the onset of the factory reset time-out period may be sent over the network. However, when the luminaire joins another network; it will be clear that the message will need to be sent on that other network. In both cases a "trigger" message will need to be sent to the luminaire over the network the luminaire is/has connected to.

Figure 1:
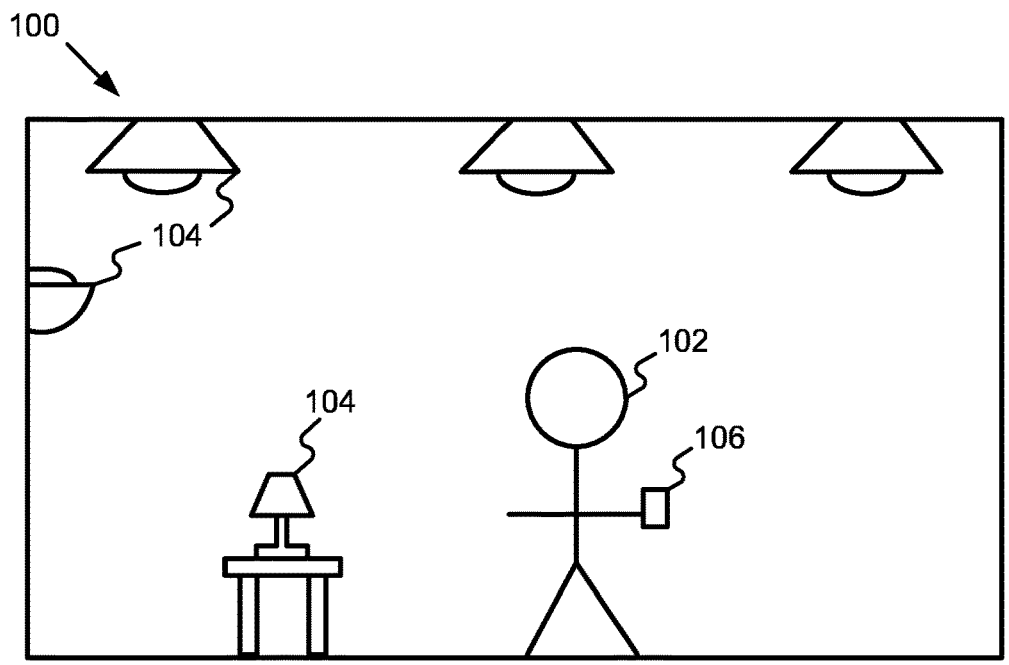
FIG. 1 shows schematically an example environment comprising a lighting system.

FIG. 1 illustrates an example environment 100 in which embodiments disclosed herein may be employed. The environment 100 is a space which may be occupied by one or more users 102. The environment 100 may take the form of an indoor space such as one or more rooms of a home, office or other building; an outdoor space such as a garden or park; a partially covered space such as a gazebo; or a combination of such spaces such as a campus or stadium or other public place that has both indoor and outdoor spaces.

The environment 100 is equipped with one or more luminaires 104 installed or otherwise disposed at different locations throughout the environment 100. A luminaire 104 may refer to any kind of illumination device for illuminating an environment or part of the environment occupied by a user 102, whether providing, for example, ambient lighting or specific task lighting. Each of the luminaires 104 may take any of a variety of possible forms, such as a ceiling or wall mounted luminaire, a free-standing floor or table luminaire, or a less traditional form such as a luminaire embedded in a surface or an item of furniture. The different luminaires 104 in the environment 100 need not take the same form as one another. Whatever form it takes, each luminaire 104 comprises at least one lamp (illumination element) and any associated housing, socket and/or support. Examples of suitable lamps include LED-based lamps, or traditional filament bulbs or gas discharge lamps.

The environment 100 is also equipped with one or more user devices 106. For example, each zone or locality may comprise a single respective user device 106. Alternatively, each zone or locality may comprise more than one respective user device 106. The user device 106 may be, for example, a mobile device including mobile or cell phones (including so-called "smart phones"), personal digital assistants, pagers, tablet and laptop computers and wearable communication devices (including so-called "smart watches").

Figure 2:
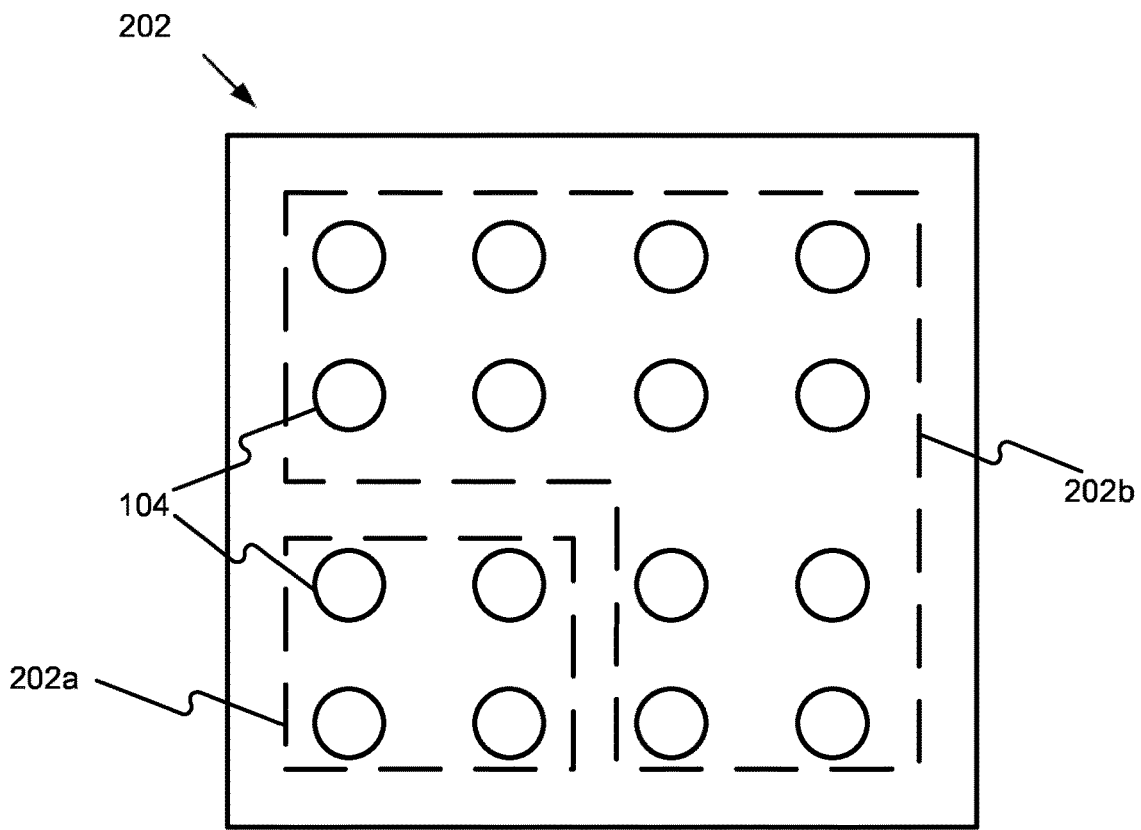
FIG. 2 shows schematically an example of a plurality of luminaires divided into network groups.

As shown in FIG. 2, in some scenarios the luminaires 104 in the environment 100 may be placed into a plurality of different network groups 202. Each network group 202 may correspond to a different zone or locality within the environment, such as different rooms, each illuminated by a different respective subset of one or more of the luminaires 104. For example, a zone may correspond to e.g. a living room, kitchen, hall, and bathroom, multiple bedrooms in a home; or multiple offices, hallways, a reception and a canteen or breakroom in an office building. In other examples, a network group 202 may not correspond to any particular zone within the environment. For example, a single zone (e.g. room) may have more than one network group 202. In another example, a network group 202 may include luminaires from more than one zone. The example of FIG. 2 shows two network groups 202a, 202b each comprising a different subset of luminaires 104.

Figure 3:
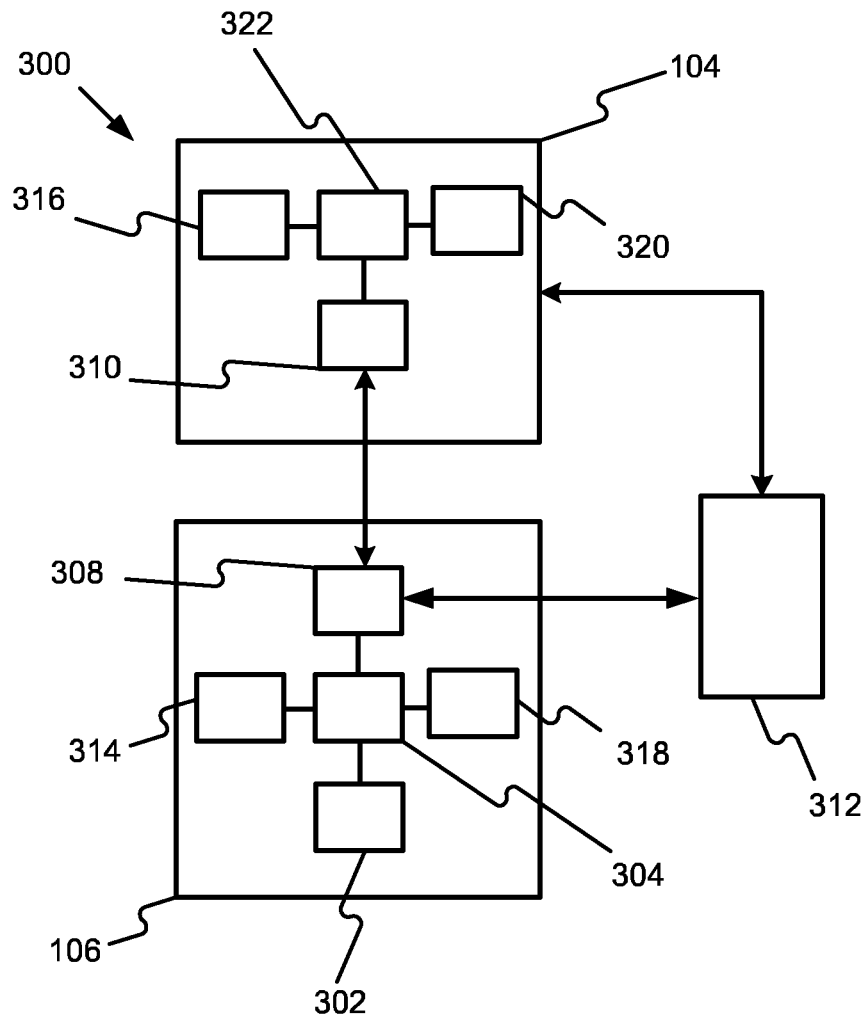
FIG. 3 shows schematically an example system for implementing a factory reset of a luminaire.

FIG. 3 illustrates an example of a system 300 for implementing a secure factory reset of a luminaire 104 through use of a user device 106. The user device 106 may optionally comprise a user interface 302 arranged to receive an input from the user and operatively coupled to a controller 304. The user interface 302 may comprise a display in the form of a screen and some arrangement for receiving inputs from the user. For example, the user interface 302 may comprise a touch screen, or a point-and-click user interface comprising a mouse, track pad, or tracker ball or the like. Alternatively or additionally, the user interface 302 may comprise a dedicated actuator or control panel for controlling the luminaires 104 within the environment. For example, the user device 106 may be in the form of a dedicated control unit (wired or wireless) which can be operated by the user, e.g. by using one or more buttons, sliders, switches and/or dials of the dedicated control panel.

The controller 304 of the user device 106 may also be coupled to the luminaire 104 discussed in relation to FIG. 1 via wireless transceivers 308, 310. The controller 304 may thereby control the luminaire 104 based on commands input by the user 102. The user device 106 and luminaire 104 may each comprise a respective wireless transmitter and receiver (or transceiver 308, 310) for communicating via any suitable wireless medium, e.g. a radio transceiver for communicating via a radio channel (though other forms are not excluded, e.g. an ultrasound or infrared transceiver). The wireless transceivers 308, 310 may comprise, for example, a ZigBee, Bluetooth, Wi-Fi, Thread, JupiterMesh, Wi-SUN, 6LoWPAN, etc. interface for communicating with the luminaire 104 or user device, respectively, and with the central bridge or server 312. For instance the radio channel may be based on the same radio access technology used by the wireless transceiver (e.g. ZigBee, Bluetooth, Wi-Fi, Thread, JupiterMesh, Wi-SUN, 6LoWPAN, etc.). The radio channel can be used by the user device 106 to control the luminaires 104.

Alternatively, the wireless transceiver 308 may communicate with the illumination sources 104 via a central bridge or a server 312, for example, over a local area network such as a WLAN or a wide area network, such as the internet. Communication may be via the wireless transceivers 308, 310. Alternatively, the luminaires 104 may each comprise a wired connection, e.g. to communicate with a central bridge 312. In some examples, the wireless transceiver 310 may communicate with other luminaires 104 via a wireless network and/or via the central lighting bridge 310, for example, over a local area network or a wide area network such as the internet. It is also not excluded that a wired connection could alternately, or additionally, be provided between the luminaires 104 themselves, or between a central lighting bridge 312 and the luminaires 104 for control purposes, e.g. an Ethernet or DMX connection.

The user device 106 also comprises a transmitter 314 configured to transmit a signal to a receiver 316 of the luminaire 104. For example, the transmitter 314 may be a radio frequency identification device (RFID) tag and the receiver 316 may be an RFID reader. In one example, the transmitter 314 may be a near field communication (NFC) element and the receiver 316 may be an NFC reader. Alternatively, the transmitter 314 may be a U-code tag and the receiver 316 may be a U-code reader. In another example, the transmitter 314 may be an optical identifier. For example, the optical identifier may be a barcode or a quick response (QR) code and the receiver 316 may be a barcode reader or a QR code reader such as a camera installed in the user device 106. In another example, the transmitter 314 and receiver 316 may be an infrared emitter and an infrared detector respectively. In yet another example, the transmitter 314 may be a light source such as, for example, a lamp, torch or flash, configured for emitting coded light messages and the receiver 316 may be a light sensor such as, for example, a camera configured for receiving coded light messages.

Similarly, the user device 106 may comprise a receiver 318 operatively coupled to the controller 304. The receiver 318 may be used to receive a signal from a transmitter 320 of a luminaire 104. For example, the transmitter 320 may be a radio frequency identification device (RFID) tag and the receiver 318 may be an RFID reader. In one example, the transmitter 320 may be a near field communication (NFC) element and the receiver 318 may be an NFC reader. In another example, the transmitter 320 may be an optical identifier. For example, the optical identifier may be a barcode or a quick response (QR) code and the receiver 318 may be a barcode reader or a QR code reader such as a camera installed in the user device 106. In another example, the transmitter 320 and receiver 318 may be an infrared emitter and an infrared detector respectively. In yet another example, the transmitter 320 may be a light source (e.g. a lamp or flashlight) configured for emitting coded light messages and the receiver 318 may be a light sensor configured for receiving coded light messages such as, for example, a camera.

The luminaire 104 has a controller 322 operatively coupled to the transmitter 316 and to the receiver 320. The controller 322 may also be operatively coupled to the wireless transceiver 310.

The following describes a system 300 and method for improving the security of implementing a factory reset of a luminaire 104, for example, to re-commission the luminaire 104.

The system comprises at least one luminaire 104 and at least one user device 106 106. The user device 106 is configured to transmit a message to the luminaire 104 via a first communication method. The message is configured to trigger the onset of a factory reset time-out period of the luminaire 104 when received by the luminaire 104. For example, the time-out may start at the point in time when the luminaire 104 receives (or processes) the message. The time-out period may be on the order of several seconds, one or more minutes, or longer.

The luminaire 104 is configured to receive the transmitted message via the first communication medium. That is, the luminaire 104 comprises a first receiver that complements the user device's first transmitter 308. For example, if the message is transmitted via a radio connection, the user device 106 and luminaire may have a radio transmitter 308 and receiver 310 respectively. Alternatively, either or both of the user device 106 and luminaire 104 may have a radio transceiver.

The first communication medium may be a secure communication medium. That is, the user device 106 may communicate with the luminaire 104 over a trusted network such as, for example, a mesh network in which the user device 106 and luminaire 104 connect directly to each other. The trusted network may require the user device 106 to authenticate itself to the luminaire 104, for example, when transmitting the message or before transmitting the message. The user device 106 may only have to authenticate itself to the luminaire 104 once, e.g. upon the initial authentication. The first communication may be a radio connection that uses a wireless networking protocol such as, for example, ZigBee, Wi-Fi or Bluetooth. Alternatively, the first communication medium is a wired communication connection between the user device 106 and the luminaire 104. For example, the wired connection may be an Ethernet connection.

The user device 106 is also configured to transmit a message (i.e. a command) to the luminaire 104 via a second communication medium that is not the same as the first communication method. The command comprises a factory reset code (FRC) that can trigger the luminaire 104 to reset to its factory settings. The second communication medium has a limited physical range. That is, the transmitted command can only be transmitted across a certain distance (radius) from the user device's second transmitter 314 and/or the transmitted message can only be received correctly within a certain distance (radius) from the second transmitter 314. In other words, the transmitted message can only be received within a given proximity of the second transmitter 314.

The second communication medium may be a wireless communication method. Herein, wireless communication medium is synonymous with a wireless communication channel, a wireless communication modality and a wireless communication access technology.

For example, the second communication medium may be infrared. That is, the user device 106 may have a second transmitter 314 in the form of an infrared emitter configured to transmit messages via infrared light. The luminaire 104 is configured to receive the transmitted command via the second communication medium. The second communication method is not the same as the first communication method. The luminaire 104 comprises a second receiver 316 that complements the user device's second transmitter 314. For example, if the message is transmitted via an infrared connection, the user device 106 and luminaire 104 may have an infrared transmitter (the second transmitter 314) and an infrared receiver (the second receiver 316) respectively.

In another example, the second communication medium may be coded light. That is, the user device 106 may be configured to use its one or more light sources 314 to transmit coded light messages. Coded light communication refers to techniques whereby information is communicated in the form of a signal embedded in the visible light emitted by a light source. Coded light is sometimes also referred to as visible light communication. Coded light communication is generally known in the art and will not be described in more detail herein.

In another example, the second communication medium may be near-field communication (NFC). NFC generally refers to a set of communication protocols that enable two electronic devices to establish communication by bringing them within a certain range of each other (e.g. 4 cm). For example, the user device 106 may comprise an active or passive NFC tag 314 which comprises the content of the message to be transmitted.

In some examples, the second communication medium may be U-code communication. U-code communication (typically within the 840 to 960 MHz frequency band) utilizes a U-code tag and a U-code reader. The user device 106 may comprise the U-code tag. The luminaire 104 may comprise the U-code reader. U-code tags can take various forms. For example, the U-code tag may be a print tag, a passive RFID tag, an active radio frequency tag, an active infrared tag, or an acoustic tag.

As another example, the second communication medium may be radio. For example, the user device 106 may have a radio transmitter 314 for transmitting via a radio communication technology such as, for example, Bluetooth, Bluetooth Low Energy, and ZigBee. Alternatively, the second communication medium may be a radio-frequency identification (RFID) medium using RFID tags. For example, the user device 106 may have an active tag with an on-board battery that transmits its signal. Alternatively, the tag may be battery-assisted passive that is activated when in the presence of an RFID reader, or the tag may be passive and use the radio energy transmitted by the reader (e.g. the receiver of the user device).

The luminaire 104 is configured to receive the command comprising the FRC from the user device 106. The luminaire 104 may be configured to extract the FRC from the command if necessary. The luminaire 104 is further configured to implement a factory reset of the luminaire (e.g. restore to factory or initial settings) if the command is received within the factory reset time-out period. That is, there is a window of time in which the luminaire 104 will implement a factory reset if a FRC is received, e.g. within a pre-determined period of time from the reception of the message for triggering the time-out period. The luminaire 104 may be configured to not implement a factory reset if a FRC is received outside of the factory time-out period, e.g. after a pre-determined period of time from the reception of the message for triggering the time-out period.

The system advantageously requires the commissioner to be present and in close proximity of the luminaire 104 to transmit the command comprising the FRC. In other words, the person trying to reset the luminaire 104 must be in a locally constrained range of the luminaire 104 when transmitting the command. Furthermore, the commissioner only has a small time-out period in which to transmit the command, outside of which the luminaire 104 may not be triggered by the reception of the FRC.

In some embodiments, the second (wireless) communication medium may have at least one additional physical constraint limiting the transmission of the command from the user device 106 to the luminaire 104, other than just a limited range (radius). For example, the at least one additional physical constraint may comprise one of: (a) requiring a line-of-sight between the luminaire 104 and the user device 106, and (b) requiring a physical contact between the luminaire 104 and the user device 106. In alternative embodiments the second communication medium is an NFC medium and the limited range of the second medium is an NFC range, e.g. 4 cm. An advantage of this is that only a person being in direct contact with or being, for example, directly underneath a luminaire 104 can transmit the command containing the reset code.

Additionally or alternatively, the first communication medium may have at least one additional physical constraint limiting the transmission of the message from the user device 106 to the luminaire 104, other than just a limited range (radius).

In embodiments, the luminaire 104 may be configured to determine if the command comprising the FRC is received within the factory reset time-out. For example, the luminaire 104 may determine a time period between the receipt of the message, from the user device 106, for triggering the time-out period and the receipt of the command, from the user device 106, comprising the FRC. In another example, the message and command may each comprise a respective transmission timestamp. The luminaire 104 may compare the two timestamps to determine if the command was transmitted within a set period (i.e. the time-out period) of the message being transmitted. In another example, the luminaire 104 may record the time of arrival of the message and command and compare the two arrival times.

The luminaire 104 may only implement a factory reset of the command if the time period is less than the time-out period. For example, the luminaire 104 may effectively ignore the command if it is received more than a set amount of time (e.g. several minutes, one hour, one day) after the luminaire 104 first receive the message from the user device 106. An advantage of this is that, for increased security, the user device 106 only has a limited amount of time to trigger the reset.

As an optional feature, the message for triggering the factory reset time-out period may include the factory reset time-out period. That is, the message may inform the luminaire 104 what the time-out period is, e.g. in seconds, minutes, hours, etc. For example, the message may tell the luminaire 104 to only accept an FRC within one minute of receiving the message. Alternatively, the message may tell the luminaire 104 to only accept an FRC command if it is received before a specific clock time. The message may sync the luminaire's clock with the clock of the user device 106.

The user device 106 may have a user interface 302 that is configured to allow a user of the user device 106 to set the time-out period. For example, the user may set a time-out period of several second, one minute, etc. The set time-out period may be included in the message, as discussed above.

In some embodiments, the system comprises one or more additional luminaires. For example, the system may comprise a second luminaire. The second luminaire 104 is configured to perform the same actions as the first luminaire. The user device 106 may transmit a message, to the second luminaire, for triggering onset of a second factory reset time-out period of the second luminaire. The message may be transmitted via the first communication medium, e.g. via Bluetooth. The user device 106 may also transmit a command to the second luminaire 104 that contains the FRC of the second luminaire. The second command may be transmitted via the second communication medium, e.g. via infrared. The second luminaire may be configured to receive the message and command via the first and second communication mediums respectively. The second luminaire may be configured to implement a factory reset of the second luminaire if the command comprising the FRC is received from the user device 106 within the second factory reset time-out period The user device 106 may broadcast a single message that triggers the onset of the factory reset time-out period of each luminaire 104 in the system. For example, the same message may be transmitted to each luminaire 104 connected to the user device 106, e.g. via a wired connection. An advantage of this is that more than one luminaire can be made open for receipt of an FRC with a single message. For example, the user may wish to reset all of the luminaires 104 within a given zone in the environment, or all of the luminaires 104 within the environment.

The first and second FRC may be identical. That is, more than one luminaire 104 may be reset by the same factory reset code. This may allow more than one luminaire 104 to be reset by the user device 106 at the same time. In these examples, the user device 106 may broadcast a single command comprising the shared FRC, e.g. via coded light. An advantage of this is that the luminaires 104 of, for example, a network group can be reset all at once. Alternatively, each luminaire 104 may have a unique factory reset code that only causes a factory reset of that respective luminaire 104.

The user device 106 may store the FRC of one or more luminaires in local storage of the user device 106 and/or at a server (e.g. in the cloud). For example, the user device 106 may receive the FRC, e.g. from the user via the user interface or from the manufacturer over the internet, and store the FRC for later use. When there is a requirement to reset the luminaire 104, e.g. after transmitting the message for triggering onset of the time-out period, the FRC is retrieved from the local storage and/or server and transmitted to the luminaire 104 in the command.

Figure 4:
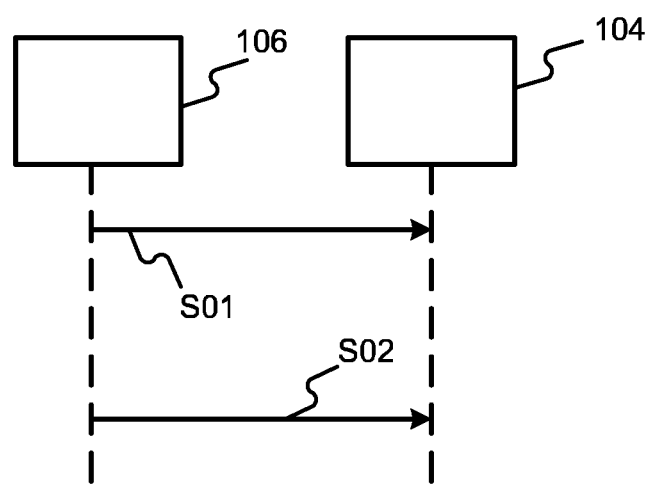
FIG. 4 shows schematically an example timing diagram of the described embodiments.

FIG. 4 illustrates an example timing diagram in accordance with the described embodiments. In the example of FIG. 4, time flows from top to bottom of the page along the dashed lines.

In the example shown in FIG. 4, at S01 a message for triggering onset of the luminaire's time-out period is sent out over a secure, trusted network by the user device 106 and received by the luminaire 104. Here, the user device 106 may be a smartphone. The trusted network may be a radio frequency network. The message may be sent over a mesh network to the user device 106, possibly via the cloud.

When there is a need to reset the luminaire 104, a factory reset key may be retrieved from memory of the user device 106 (e.g. via an app) or from cloud storage and sent at S02 as an infrared (or coded light, NFC, U-code, etc.) command to the luminaire 104. Upon reception of the command, the luminaire 104 determines if the factory reset key was received within the time-out period. This procedure authenticates that the person that sends the factory reset code is standing under the fixture (due to IR usage).

The controller 304 is configured to perform the actions of the user device 106 described below and elsewhere herein. For example, the controller 304 is configured to receive the user commands via the user interface 302. The controller 304 is also configured to communicate with the one or more luminaires 104 within the environment 100 via the wireless transceiver 308 as detailed above. The controller 304 is also configured to communicate with the central bridge or server 312 via the wireless transceiver 308 as detailed below. The controller 304 is also configured to cause the transmission of commands to the luminaire 104. The controller 304 is also configured to process the received messages, e.g. to extract the FRC.

Likewise, the controller 322 is configured to perform the equivalent operations of the luminaire 104.

In embodiments the controller 304 is implemented in the form of software stored in memory and arranged for execution on a processor (the memory on which the software is stored comprising one or more memory units employing one or more storage media, e.g. EEPROM (electrically erasable programmable read-only memory) or a magnetic drive, and the processor on which the software is run comprising one or more processing units). Alternatively, some or all of the controller 304 could be implemented in dedicated hardware circuitry, or configurable or reconfigurable hardware circuitry such as an ASIC (application-specific integrated circuit) or a PGA (programmable gain amplifier) or FPGA (field-programmable gate array). Whatever form it takes, in embodiments the controller 304 may be implemented internally in a single user device 106 along with the user interface 302 and the wireless transceiver 308, i.e. in the same housing. Alternatively the controller 304 could, partially or wholly, be implemented externally such as on a lighting bridge or a server 312 comprising one or more server units at one or more geographic sites. Alternatively, the controller 304 may be partially or wholly implemented across one or more user devices 106. Where required, suitable remote communication and/or distributed processing techniques will, in themselves, be familiar to a person skilled in the art.

The luminaire 104 comprises the controller 322 operatively coupled to the transmitter 316 and receiver 320 of the luminaire for controlling and communicating with the transmitter 316 and receiver 320. In embodiments the controller 322 is implemented in the form of software stored in memory and arranged for execution on a processor (the memory on which the software is stored comprising one or more memory units employing one or more storage media, e.g. EEPROM (electrically erasable programmable read-only memory) or a magnetic drive, and the processor on which the software is run comprising one or more processing units). Alternatively, some or all of the controller 322 could be implemented in dedicated hardware circuitry, or configurable or reconfigurable hardware circuitry such as an ASIC (application-specific integrated circuit) or a PGA (programmable gain amplifier) or FPGA (field-programmable gate array). Whatever form it takes, in embodiments the controller 322 may be implemented internally in a single luminaire 104 along with the wireless transceiver 310, transmitter 316 and receiver 320, i.e. in the same housing. Alternatively the controller 322 could, partially or wholly, be implemented externally such as on a lighting bridge or a server 312 comprising one or more server units at one or more geographic sites. Alternatively, the controller 322 may be partially or wholly implemented across one or more luminaires 104.

In embodiments the functionality of the central bridge/server 312 is implemented in the form of software stored in memory and arranged for execution on a processor (the memory on which the software is stored comprising one or more memory units employing one or more storage media, e.g. EEPROM or a magnetic drive, and the processor on which the software is run comprising one or more processing units). Alternatively it is not excluded that some or all of the functionality of the central bridge/server 312 could be implemented in dedicated hardware circuitry, or configurable or reconfigurable hardware circuitry such as an ASIC or a PGA or FPGA. Also note again that the central bridge or server 312 may be implemented locally within the environment 100 or at a remote location, and may comprise one or more physical units at one or more geographic sites.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system for implementing a reset of a luminaire comprising:
the luminaire; and
a user device,
wherein the user device is configured to transmit, to the luminaire, a message for triggering onset of a factory reset time-out period of the luminaire, wherein the message is transmitted via a first communication medium;
wherein the luminaire is configured to receive, from the user device, the message for triggering the onset of the factory reset time-out period of the luminaire, wherein the message is received via the first communication medium;
wherein the user device is configured to transmit, from the user device directly to the luminaire, a command comprising a factory reset code, FRC, for triggering a factory reset of the luminaire, wherein the command is transmitted via a second, different, wireless communication medium having a limited physical transmission range, the second wireless communication medium selected from a) infrared, b) coded light, c) radio or d) near-field communication; and
wherein the luminaire is configured to:
receive, from the user device, the command comprising the FRC, wherein the command is received via the second wireless communication medium; and
implement a factory reset of the luminaire if the command comprising the FRC is received from the user device within the factory reset time-out period.

2. A system according to claim 1, wherein the system comprises a second luminaire, wherein the user device is configured to transmit, to the second luminaire, a second message for triggering onset of a second factory reset time-out period of the second luminaire, wherein the second message is transmitted via the first communication medium;
wherein the second luminaire is configured to receive, from the user device, the second message for triggering onset of the factory reset time-out period of the second luminaire, wherein the message is received via the first communication medium;
wherein the user device is configured to transmit, to the second luminaire, a second command comprising a factory reset code, FRC, for triggering a factory reset of the second luminaire, wherein the second command is transmitted via the second wireless communication medium; and
wherein the second luminaire is configured to:
receive, from the user device, the second command comprising the FRC, wherein the second command is received via the second wireless communication medium; and
implement a factory reset of the second luminaire if the second command comprising the FRC is received from the user device within the second factory reset time-out period.

3. A system according to claim 1, wherein the second wireless communication medium has at least one additional physical constraint limiting the transmission of the command from the user device to the luminaire.

4. A system according to claim 3, wherein the at least one additional physical constraint comprises at least one of: a) requiring a line-of-sight between the luminaire and the user device, and b) requiring a physical contact between the luminaire and the user device.

5. A system according to claim 1, wherein the luminaire is configured to determine if the command comprising the FRC is received within the factory reset time-out period.

6. A system according to claim 1, wherein the first communication medium is radio.

7. A system according to claim 1, wherein the first communication medium is a wired communication connection between the user device and the luminaire.

8. A system according to claim 1, wherein the message for triggering the factory reset time-out period comprises the factory reset time-out period.

9. A system according to claim 1, wherein the user device is configured to allow a user of the user device to set the factory reset time-out period.

10. A system according to claim 2, wherein the one or more luminaires share the same FRC, and wherein the user device is configured to broadcast a single command comprising the shared FRC, wherein the single command is broadcast via the second wireless communication medium.

11. A system according to claim 2, wherein the user device is configured to broadcast a single message for triggering onset of the factory reset time-out period of one or more luminaires in the system, wherein the single message is broadcast via the first communication medium.

12. A user device comprising:
- a first transmitter configured to transmit, to a luminaire, a message for triggering onset of a factory reset time-out period of the luminaire, wherein the message is transmitted via a first communication medium;
- a second transmitter configured to transmit, directly to the luminaire, a command comprising a factory reset code, FRC, for triggering a factory reset of the luminaire, wherein the command is transmitted via a second, different wireless communication medium having a limited transmission range, the second wireless communication medium selected from a) infrared, b) coded light, c) radio, or d) near-field communication; and
- a controller configured to:
- cause the first transmitter to transmit the message for triggering onset of the factory reset time-out period of the luminaire; and
- cause the second transmitter to transmit the command comprising the FRC.

13. A method of implementing a reset of a luminaire comprising:
- transmitting, from a user device to the luminaire, a message for triggering onset of a factory reset time-out period of the luminaire, wherein the message is transmitted via a first communication medium;
- receiving, at the luminaire from the user device, the message for triggering onset of the factory reset time-out period of the luminaire, wherein the message is received via the first communication medium;
- transmitting, directly from the user device to the luminaire, a command comprising a factory reset code, FRC, for triggering a factory reset of the luminaire, wherein the command is transmitted via a second, different wireless communication medium having a limited transmission range, the second wireless communication medium selected from a) infrared, b) coded light, c) radio, or d) near-field communication;
- receiving, at the luminaire from the user device, the command comprising the FRC, wherein the command is received via the second wireless communication medium; and
- implementing a factory reset of the luminaire if the command comprising the FRC is received from the user device within the factory reset time-out period.

14. A luminaire comprising:
- a first receiver configured to receive, from a user device via a first communication medium, a message for triggering onset of a factory reset time-out period of the luminaire; and
- a second receiver configured to receive, directly from the user device via a second, different communication medium having a limited transmission range, a command comprising a factory reset code, FRC, the second wireless communication medium selected from a) infrared, b) coded light, c) radio, or d) near-field communicate; and
- a controller configured to:
- determine if the command comprising the FRC is received within the factory reset time-out period; and
- implement a factory reset of the luminaire, if the command comprising the FRC is determined to be received from the user device within the factory reset time-out period.

* * * * *